(12) United States Patent
Choi

(10) Patent No.: US 7,417,689 B2
(45) Date of Patent: Aug. 26, 2008

(54) APPARATUS FOR GENERATING ON-SCREEN DISPLAY IN DIGITAL TV

(75) Inventor: Myeong Seok Choi, Suhyun-si (KR)

(73) Assignee: Humax Co., Ltd., Yougin (KR)

( * ) Notice: Subject to any disclaimer, the term of this patent is extended or adjusted under 35 U.S.C. 154(b) by 512 days.

(21) Appl. No.: 11/100,551

(22) Filed: Apr. 7, 2005

(65) Prior Publication Data

US 2005/0225677 A1   Oct. 13, 2005

(30) Foreign Application Priority Data

Apr. 12, 2004   (KR)  ....................... 10-2004-0024820

(51) Int. Cl.
*H04N 5/50* (2006.01)
(52) U.S. Cl. ................... 348/569; 348/563; 348/554; 348/555
(58) Field of Classification Search ............... 348/569, 348/553–555, 363, 558, 734, 725; 725/40; *H04N 5/50*
See application file for complete search history.

(56) References Cited

U.S. PATENT DOCUMENTS

| | | | | |
|---|---|---|---|---|
| 5,461,428 A | * | 10/1995 | Yoo | 348/558 |
| 6,226,047 B1 | * | 5/2001 | Ryu | 348/569 |
| 6,992,728 B2 | * | 1/2006 | Takagi et al. | 348/569 |
| 7,068,322 B2 | * | 6/2006 | Tsubouchi | 348/485 |
| 2003/0218693 A1 | * | 11/2003 | Ikeguchi | 348/554 |
| 2004/0038704 A1 | * | 2/2004 | Takagi | 455/550.1 |

\* cited by examiner

Primary Examiner—Trang U Tran
(74) Attorney, Agent, or Firm—Ked & Associates, LLP

(57) ABSTRACT

An apparatus for generating an OSD in a digital TV is provided, which comprises an OSD generator for generating an OSD associated with a digital broadcast received through a digital tuner and an OSD associated with an analog broadcast received through an analog tuner, and a controller for controlling the OSD generator according to a user command requesting that the OSD be displayed. The OSD associated with the analog broadcast and the OSD associated with the digital broadcast are processed in an image processor in an integrated manner under the control of the controller for controlling the OSD generator, thereby preventing degradation of the image quality of the OSD associated with the digital broadcast.

15 Claims, 3 Drawing Sheets

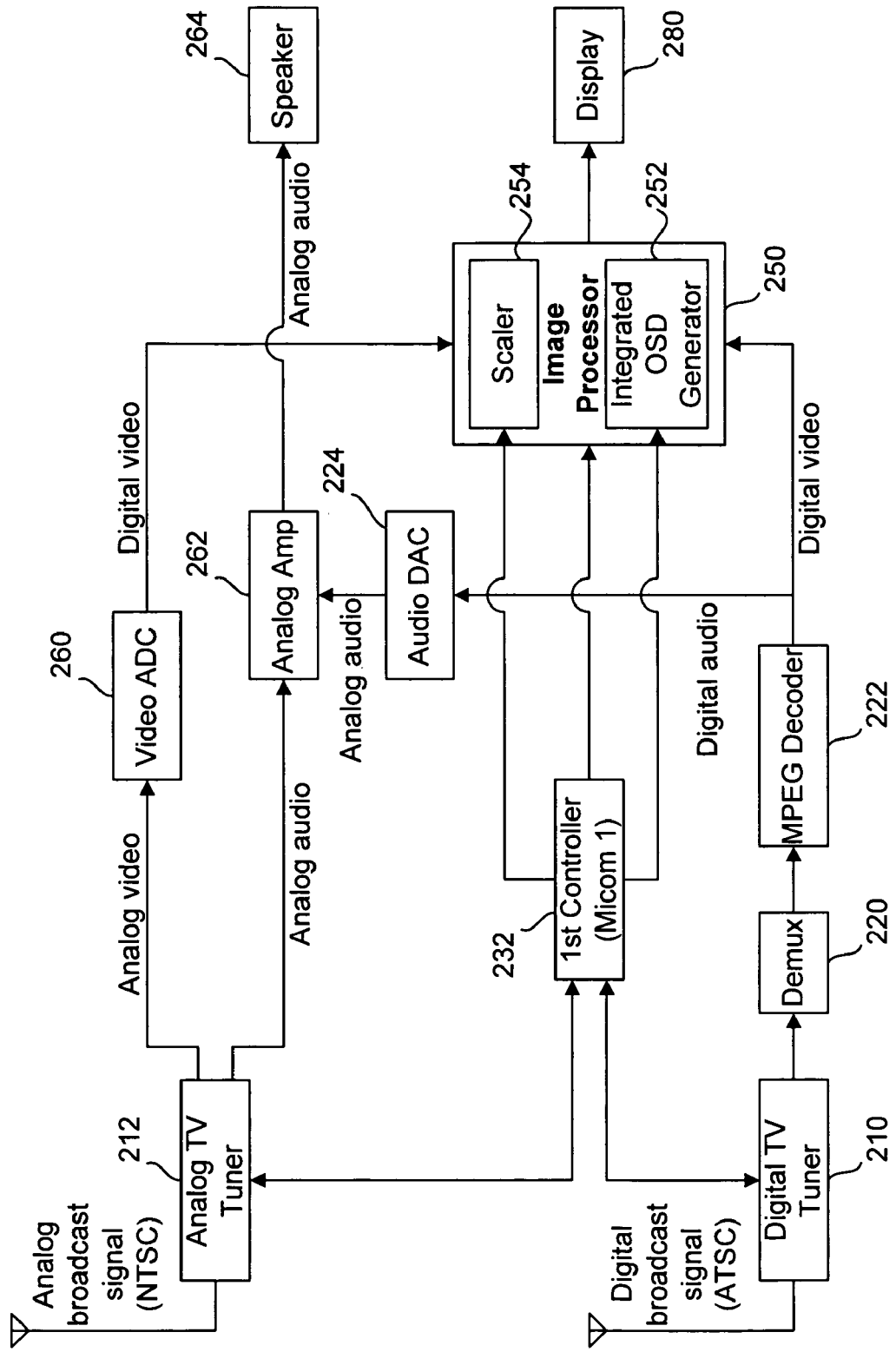

APPARATUS FOR GENERATING ON-SCREEN DISPLAY IN DIGITAL TV

BACKGROUND OF THE INVENTION

1. Field of the Invention

The present invention relates to a digital television (TV), and more particularly to a digital TV that processes an On-Screen Display (OSD) for analog broadcasts and an OSD for digital broadcasts in an integrated manner.

2. Description of the Related Art

Currently provided broadcasts include both analog and digital broadcasts. Thus, current digital TVs have been manufactured so as to be able to receive not only digital broadcast signals but also analog broadcast signals.

FIG. 1 is a block diagram of a conventional digital TV. The configuration of the conventional digital TV is described below with reference to FIG. 1.

The conventional digital TV includes a digital tuner 110, an analog tuner 112, a demultiplexer 120, an MPEG decoder 122, an audio digital-to-analog converter (DAC) 124, a first controller (MICOM 1) 130, a first OSD generator 140, an image processor 150, a video analog-to-digital converter (ADC) 160, an analog amplifier 162, a speaker 164, a second controller (MICOM 2) 170, a display 180, and a key input unit (not shown). The digital tuner 110 receives digital broadcast signals, and the analog tuner 112 receives analog broadcast signals. The demultiplexer 120 divides a digital broadcast signal received through the digital tuner 110 into audio and video signals. The MPEG decoder 122 processes the audio and video signals divided by the demultiplexer 120. The ADC 160 converts an analog video signal of the analog broadcast signal received through the analog tuner 112 into a digital video signal. The analog amplifier 162 amplifies both an analog audio signal of the analog broadcast signal received through the analog tuner 112, and an analog audio signal, which is produced by the DAC 124 through conversion of a digital audio signal output from the MPEG decoder 124. The speaker 164 outputs audio signals amplified by the analog amplifier 162. The key input unit (not shown) receives user commands for selecting and setting various functions of the digital TV. The first OSD generator 140 generates an OSD signal for the digital broadcast signal according to user commands input through the key input unit (not shown), and outputs the generated OSD signal to the image processor 150. The first controller 130 controls the first OSD generator 140 to display an OSD screen on the display 180 and controls the overall operation of the digital TV to perform various functions according to user commands input through the key input unit.

The term "OSD" refers to any type of information such as text, a figure, and a menu, other than broadcast images, displayed on the display 180 to indicate states of the digital TV and allow the user to input commands for setting and changing parameters of various functions of the digital TV. For example, the OSD includes a channel number input field, time information, and menu information, which are overlaid on broadcast images on the display 180.

Since current broadcasting systems provide both analog and digital broadcast signals, the first OSD generator 140 for digital broadcast signals and the second OSD generator 152 for analog broadcast signals are individually provided in the conventional digital TV as shown in FIG. 1.

The second OSD generator 152 is embedded in the image processor 150, and the second controller 170 is separately provided to control the second OSD generator 152.

The image processor 150 includes the scaler 154 that functions to appropriately adjust the resolution of video images or graphics input to the image processor 150. The second controller 170 also controls the scaler 154.

The second controller 170 further controls image quality-related aspects of the picture displayed on the display 180, such as brightness, contrast, sharpness, color temperature, and RGB color.

The digital TV configured as described above operates in the following manner. If the user selects a channel through the key input unit (not shown), the digital tuner 110 or the analog tuner 112 tunes in to the selected channel and receives its broadcast signals.

A digital broadcast signal (ATSC) received through the digital tuner 110 is divided into audio and video signals through the demultiplexer 120 and the MPEG decoder 122. An analog broadcast signal (NTSC) received through the analog tuner 112 is converted into a digital video signal through the video ADC 160, which is then output to the image processor 150.

That is, digital and analog broadcast signals are received through the digital and analog tuners 110 and 112, respectively, and the received digital and analog broadcast signals are separately processed as shown in FIG. 1.

If the user selects an OSD key on the key input unit, for example, on a remote controller or on a key panel provided on the main body of the digital TV, the first or second controller 130 or 170 detects this selection and controls the first or second OSD generator 140 or 152 to display various digital and analog function menus in the form of an OSD on the display 180.

In the conventional digital TV described above, an OSD associated with a digital broadcast and a video image layer are combined into a single digital video signal, which is then transferred to the image processor 150. Even if a digital signal having a very high image quality is transferred to the image processor 150, the image quality of the OSD associated with the digital broadcast is lowered since the scaler 154 and the second OSD generator 152 in the image processor 150 are controlled by the second controller 170 responsible for controlling analog signals.

In order to receive digital and analog broadcast signals, the conventional digital TV includes the digital tuner 110 and the analog tuner 112 and a plurality of controllers (MICOM 1,2) 130 and 170 for controlling the tuners 110 and 112. The controllers 130 and 170 have different responsibilities.

The first controller 130 is responsible for controlling the digital tuner 110, managing digital channels, and controlling other operations of the digital TV, which are associated with the digital tuner 110. The second controller 170 is responsible for controlling the analog tuner 112, managing analog channels, and controlling display image quality or the like.

In the conventional digital TV, in order to draw and display an OSD associated with a digital broadcast, which includes an Electronic Program Guide (EPG), a digital channel related menu, and a digital channel list, on the display 180, the first controller 130 responsible for controlling the digital tuner 110 controls the separate OSD generator 140 to generate an OSD, and combines the generated OSD and a digital broadcast image into a single video signal, and then transfers the single video signal to the image processor 150.

Since an OSD image associated with a digital broadcast is not generated by the OSD generator 152 in the image processor 150 but is instead combined into a single video signal and then transferred to the image processor 150, the image quality of the OSD is lowered.

In addition to the lowered OSD image quality, since OSDs associated with digital and analog broadcasts are generated respectively by the first and second controllers 130 and 170 having different performance and characteristics, it is difficult to manage analog and digital channels in an integrated manner, and also the generated digital and analog broadcast OSDs have different formats. Even if OSDs associated with digital and analog broadcasts are designed to have the same format, they are different in terms of format in actual implementation since the controllers 130 and 170 and the OSD generators 140 and 152 for generating OSDs associated with digital and analog broadcasts have different performance.

Further, the first controller 130 for controlling the digital tuner 110 and the second controller 170 for controlling the analog tuner 112 do not perform data management in an integrated manner, thereby lowering their processing performance.

SUMMARY OF THE INVENTION

Therefore, the present invention has been made in view of the above problems, and it is an object of the present invention to provide a device for generating OSDs in a digital TV that receives both analog and digital broadcasts, which prevents degradation of the image quality of an OSD associated with digital broadcasts.

In accordance with the present invention, the above and other objects can be accomplished by the provision of an apparatus for generating an On-Screen Display (OSD) in a digital TV, the apparatus comprising an OSD generator for generating an OSD associated with a digital broadcast received through a digital tuner and an OSD associated with an analog broadcast received through an analog tuner; and a controller for controlling the OSD generator according to a user command requesting that the OSD be displayed.

Preferably, the apparatus further comprises an image processor for performing image processing so that the generated OSD is overlaid on an image of the received broadcast, wherein the OSD generator is provided in the image processor. Preferably, the image processor further includes a scaler for adjusting the resolution of images of the broadcast or graphics, which is controlled by the controller. Preferably, the controller controls the digital and analog tuners.

Preferably, the apparatus further comprises a second controller responsible for controlling image quality-related aspects of a picture to be displayed on the digital TV, and data communication is preferably performed between the controller for controlling the OSD generator and the second controller. Preferably, the controller for controlling the OSD generator controls the image quality-related aspects. Preferably, the image quality-related aspects include brightness, contrast, sharpness, color temperature, RGB color, or the like.

Preferably, the OSD provides a user interface for indicating states of the digital TV and setting functions thereof. Preferably, the OSD associated with the digital broadcast includes an electronic program guide, a digital channel list, a digital channel search menu, a digital broadcast setup menu, or the like. Preferably, the OSD associated with the analog broadcast includes an analog channel search menu, an analog channel list, a channel number input field, and the like.

According to the present invention, the controller of the digital tuner directly controls the OSD generator provided in the image processor to generate OSDs associated with digital and analog broadcasts, thereby preventing degradation of the image quality of the OSD associated with the digital broadcast, which is caused in the conventional digital TV. Since all of the OSDs associated with digital and analog broadcasts are generated by the single OSD generator, it is easy to manage analog and digital broadcasts in an integrated manner, and it is also possible to implement a consistent user interface format.

In the conventional digital TV, the first OSD generator, which is responsible for generating a user interface OSD for controlling the digital tuner and displaying data associated with the digital broadcast, and the second OSD generator, which is responsible for generating a user interface OSD for displaying data associated with the analog broadcast and a user interface OSD for controlling image quality-related aspects of the picture to be displayed, are separately provided, and the first and second OSD generators are controlled respectively by two separate controllers. However, the digital TV according to the present invention includes an integrated OSD generator, instead of both the first and second OSD generators, which is controlled by the controller (i.e., the first controller) responsible for controlling the digital tuner. The second controller is implemented so as to perform only control functions associated with image processing of the digital TV, and the first and second controllers are configured to be able to communicate data with each other so that all elements of the digital TV are integrated into one system.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a block diagram of a digital TV according to another embodiment of the present invention.

DETAILED DESCRIPTION OF PREFFERRED EMBODIMENTS

Preferred embodiments of the present invention will now be described in detail with reference to the accompanying drawings.

Figure 1:
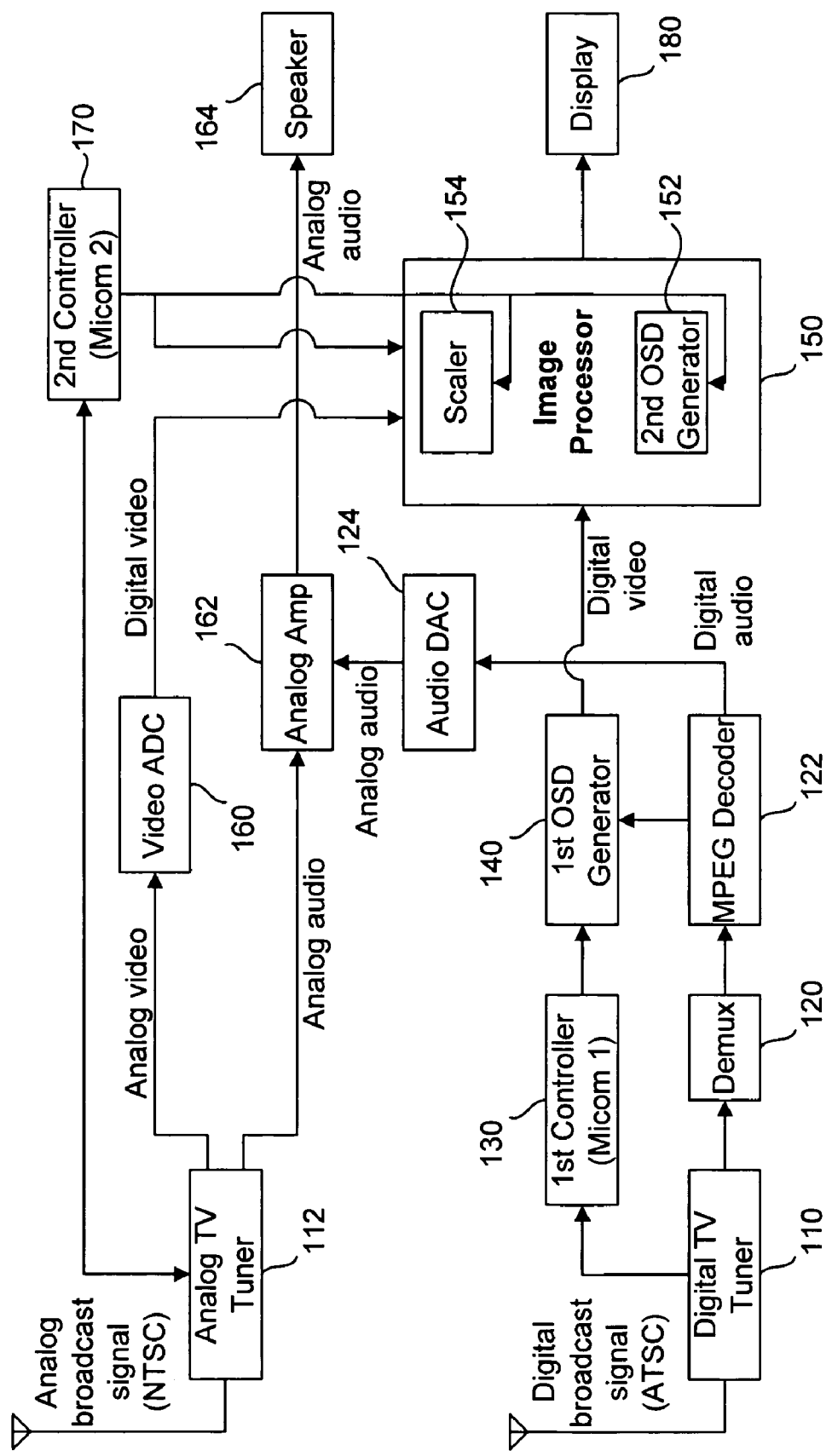
FIG. 1 is a block diagram of a conventional digital TV.
Figure 2:
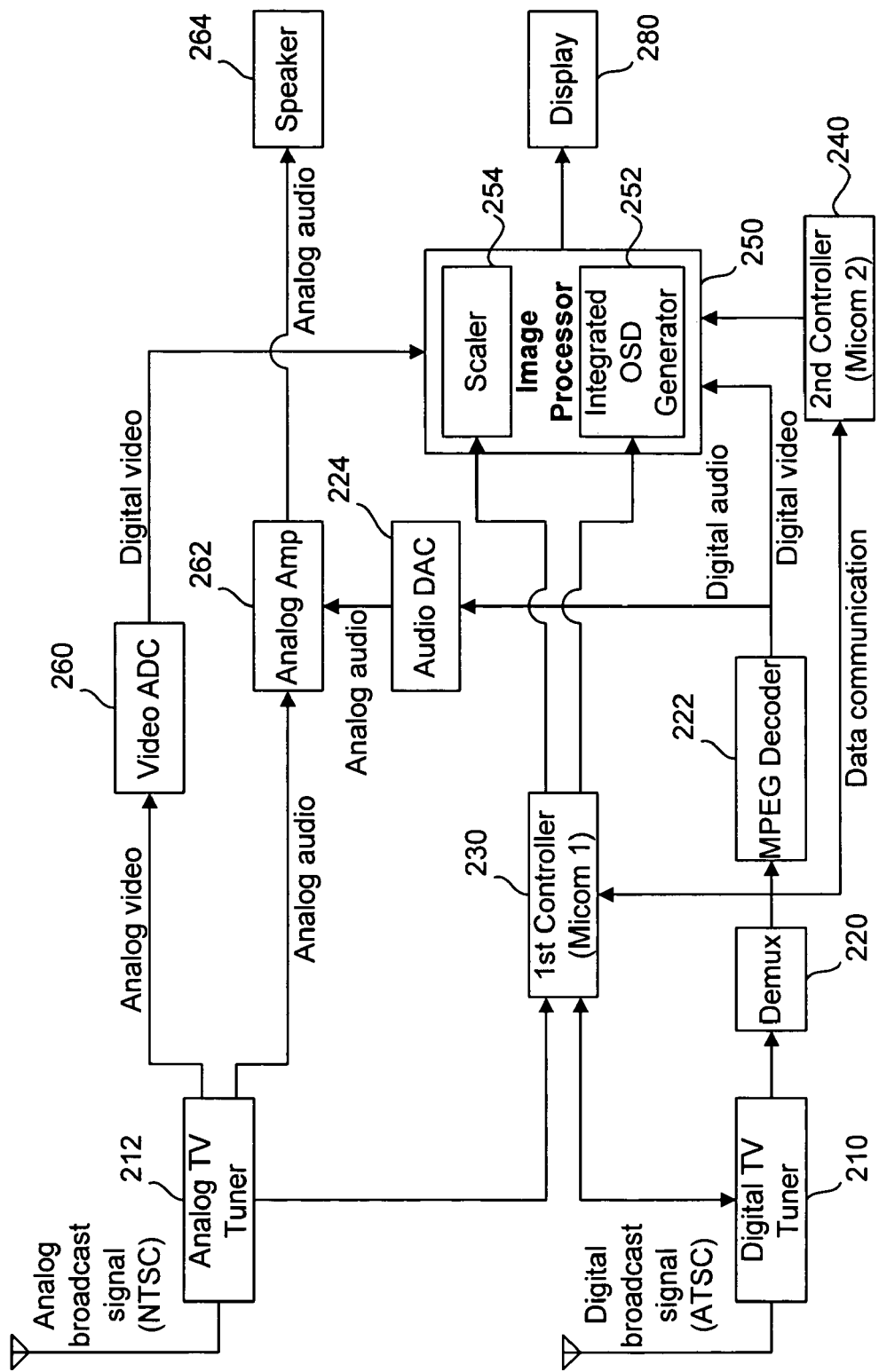
FIG. 2 is a block diagram of a digital TV according to one embodiment of the present invention.

FIG. 2 is a schematic block diagram of a digital TV according to one embodiment of the present invention.

As shown in FIG. 2, the digital TV according to this embodiment receives digital and analog broadcast signals through digital and analog tuners 210 and 212. The digital TV includes both the digital and analog tuners 210 and 212 since all of the currently provided broadcasts are not digital broadcasts.

First, a description is given of components of the digital TV, which are responsible for processing digital broadcast signals. The digital TV includes a demultiplexer 220 for dividing a digital broadcast signal received through the digital tuner 210 into audio and video signals, and an MPEG decoder 222 for processing the divided audio and video signals.

A digital audio signal, into which the MPEG decoder 222 decodes the audio signal output from the demultiplexer 220, is output to a speaker 264 via an audio digital-to-analog converter (DAC) 224 and an analog amplifier 262.

A digital video signal, into which the MPEG decoder 222 decodes the video signal output from the demultiplexer 220, is input to an image processor 250, and is then output to a display 280 after being subjected to predetermined processing in the image processor 250.

The image processor 250 includes a scaler 254 for appropriately adjusting the resolution of video images or graphics input to the image processor 250. The image processor 250 may be configured so as to be included in a display controller (not shown) for controlling the display 280.

If the user activates an OSD using a key input unit (not shown) such as a remote controller in order to select or set various functions, an integrated OSD generator 252 provided in the image processor 250 generates an OSD signal for the digital broadcast according to user commands input through the key input unit.

The present invention is characterized in that the OSD generator 252 for digital broadcasts is embedded in the image processor 250, and that the OSD generator 252 is also responsible for generating a user interface OSD for displaying data associated with an analog broadcast and a user interface OSD for controlling image quality-related aspects of the picture displayed on the display 280, which will be described later.

The term "OSD" refers to any type of information such as text, a figure, and a menu, other than broadcast images, displayed on the display 280 to indicate states of the digital TV and allow the user to input commands for setting and changing parameters of various functions of the digital TV. For example, the OSD includes a channel number input field, time information, and menu information, which are overlaid on broadcast images on the display 280.

The OSD associated with a digital broadcast includes an Electronic Program Guide (EPG), a digital channel list, a digital channel search menu, a digital TV setup menu, and the like. The OSD associated with an analog broadcast includes an analog channel search menu, an analog channel list, a channel number input field, and the like.

The digital TV further includes, as a component for processing digital broadcast signals, a first controller (MICOM 1) 230 for controlling the overall operation of the digital TV to perform various functions according to user commands input through the key input unit (not shown) and for controlling the integrated OSD generator 252 to display an OSD screen on the display 280.

The first controller 230 controls not only the digital tuner 210 but also the analog tuner 212, which will be described later.

Next, a description is given of components of the digital TV, which are responsible for processing analog broadcast signals. An analog video signal of the analog broadcast signal received through the analog tuner 212 is converted to a digital video signal through the video ADC 260, which is then input to the image processor 250. An analog audio signal of the analog broadcast signal received through the analog tuner 212 is output through the speaker 264 after being amplified through the analog amplifier 262.

The integrated OSD generator 252 provided in the image processor 250 also generates an OSD associated with the digitalized video signal, which is converted from the analog video signal received through the analog tuner 212 and is then input to the image processor 250. The integrated OSD generator 252 is also controlled by the first controller 230.

The scaler 254 provided in the image processor 250 is also controlled by the first controller 230.

According to the present invention, an OSD associated with an analog broadcast and an OSD associated with a digital broadcast are processed in an integrated manner under the control of the first controller 230 as described above, thereby preventing degradation of the image quality of the OSD associated with the digital broadcast.

Accordingly, the second controller 240 is responsible only for controlling image quality-related aspects of the picture displayed on the display 280, such as brightness, contrast, sharpness, color temperature, and RGB color.

The present invention is also characterized in that the first and second controllers 230 and 240 can perform data communication with each other. That is, data communication can be performed between the first controller 230 responsible for performing data management of all elements of the digital TV and controlling the OSD generator 252 and the scaler 254, and the second controller 240 responsible for performing control functions associated with image processing of the digital TV, thereby preventing degradation of processing performance of the controllers 230 and 240.

The digital TV according to this embodiment of the present invention operates in the following manner. If the user selects a channel through the remote controller, the digital tuner 210 or the analog tuner 212 tunes in to the selected channel and receives its broadcast signals.

A digital broadcast signal received through the digital tuner 210 is divided into audio and video signals through the demultiplexer 220 and the MPEG decoder 222. An analog broadcast signal received through the analog tuner 212 is converted into a digital video signal through the video ADC 260, which is then output to the image processor 250.

That is, digital and analog broadcast signals are received through the digital and analog tuners 210 and 212, respectively, and the received digital and analog broadcast signals are separately processed as shown in FIG. 2.

If the user selects an OSD key on the key input unit (not shown), for example, on the remote controller or on the key panel provided on the main body of the digital TV, the first controller 230 detects this selection and controls the integrated OSD generator 252 to display various digital and analog function menus in the form of an OSD on the display 280, thereby preventing degradation of the image quality of the OSD associated with the digital broadcast.

As described below, the second controller 240 may be integrated into the first controller 230, instead of being separately provided, so that the first controller 230 performs all functions of the second controller 240.

FIG. 3 is a schematic block diagram of a digital TV according to another embodiment of the present invention. As shown in FIG. 3, in this embodiment, the second controller 240 is not provided but instead a first controller 232 is configured so as to perform operations of the second controller.

The other elements of the digital TV in this embodiment have the same configuration and operation as those in the previous embodiment, which are described above with reference to FIG. 2, and thus they are denoted by the same reference numerals and a description thereof is omitted herein.

As is apparent from the above description, the present invention provides an apparatus for generating an OSD in a digital TV, which prevents degradation of the image quality of an OSD associated with digital broadcasts, and also prevents degradation of processing performance of controllers, which is caused by redundancy of the controllers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating an On-Screen Display (OSD) in a digital TV, the apparatus comprising:
   an OSD generator adapted to generate an OSD associated with a digital broadcast received through a digital tuner and an OSD associated with an analog broadcast received through an analog tuner;

an image processor adapted to perform image processing operations including an overlay of the generated OSD on an image of the received broadcast, the image processor comprising a scaler for adjusting resolution of images of the broadcast or graphics, the OSD generator being embedded in the image processor; and a first controller adapted to control the OSD generator according to a user command requesting that the OSD be displayed and adapted to control the digital tuner, the analog tuner and the scaler, wherein the apparatus is adapted to supply a digital video signal based on the analog broadcast and a digital video signal based on the digital broadcast to the image processor for being processed under control of the first controller.

2. The apparatus according to claim 1, wherein the first controller controls an image quality-related aspect of a picture to be displayed.

3. The apparatus according to claim 1, further comprising a second controller adapted to control an image quality-related aspect of a picture to be displayed.

4. The apparatus according to claim 3, wherein data communication is performed between the first controller and the second controller.

5. The apparatus according to claim 2, wherein the image quality-related aspect includes at least one of brightness, contrast, sharpness, color temperature or RGB color.

6. The apparatus according to claim 1, wherein the OSD provides a user interface for indicating states of the digital TV and setting functions thereof.

7. The apparatus according to claim 6, wherein the OSD associated with the digital broadcast includes at least one of an electronic program guide, a digital channel list, a digital channel search menu, or a digital broadcast setup menu.

8. The apparatus according to claim 6, wherein the OSD associated with the analog broadcast includes at least one of an analog channel search menu, an analog channel list, or a channel number input field.

9. An apparatus for generating an On-Screen Display (OSD) in a digital TV, the apparatus comprising:

an image processor coupled to receive a first digital video signal derived from an analog broadcast and a second digital video signal derived from a digital broadcast, said processor including:

a scaler to adjust resolution of an image corresponding to at least one of the first digital video signal, the second digital video signal, or graphics, and an OSD generator to generate a first OSD corresponding to the digital broadcast and a second OSD corresponding to the analog broadcast, the generated OSD combined with one of the first digital video signal or second digital video signal for display; and a first controller to control the OSD generator according to a user command to display one of the first OSD or the second OSD.

10. The apparatus according to claim 9, further comprising:

an analog tuner to receive an analog broadcast signal; and a digital tuner to receive a digital broadcast signal, wherein the first controller controls the OSD generator, the scaler, the analog tuner, and the digital tuner at a same time.

11. The apparatus according to claim 9, wherein the image processor overlays the generated OSD over an image corresponding to one of the analog broadcast or the digital broadcast, after resolution of the image is adjusted by the scaler.

12. The apparatus according to claim 9, wherein the first controller controls the image processor to adjust one or more image quality-related parameters of a picture to be displayed.

13. The apparatus according to claim 9, further comprising:

a second controller, separate from the first controller, to control the image processor to adjust one or more image quality-related parameters of a picture to be displayed.

14. The apparatus according to claim 9, wherein the OSD corresponding to the digital broadcast includes at least one of an electronic program guide, a digital channel list, a digital channel search menu, or a digital broadcast setup menu.

15. The apparatus according to claim 14, wherein the OSD corresponding to the analog broadcast includes at least one of an analog channel search menu, an analog channel list, or a channel number input field.

* * * * *